May 15, 1956     A. E. ZECH     2,745,208

FISHHOOK

Filed Aug. 7, 1953

Inventor:
August E. Zech,
by
His Attorneys.

United States Patent Office 2,745,208
Patented May 15, 1956

2,745,208
FISHHOOK

August E. Zech, Albany, N. Y.

Application August 7, 1953, Serial No. 373,001

2 Claims. (Cl. 43—44.8)

My invention relates to the art of fishing and particularly to a new type of fish hook adapted for use with live bait.

The principal object of my invention is to provide a fish hook having combined therewith a novel element for attaching live bait, such as a minnow, to said hook. Another object is to provide a bait attaching means of this character which will prevent the bait from getting off the hook, cause less injury to the bait, and, therefore, maintain it in a live condition for a longer time than where the barb of the hook is forced through the bait. A further object is to provide a hook for live bait in which a fish cannot remove the bait from the hook without being caught.

I accomplish these objects by the means described below and illustrated in the accompanying drawing in which—

Referring to the drawings—

1 represents generally a hook of conventional type comprising the shank 2, the barb 3, and the eye 4.

Figure 1:
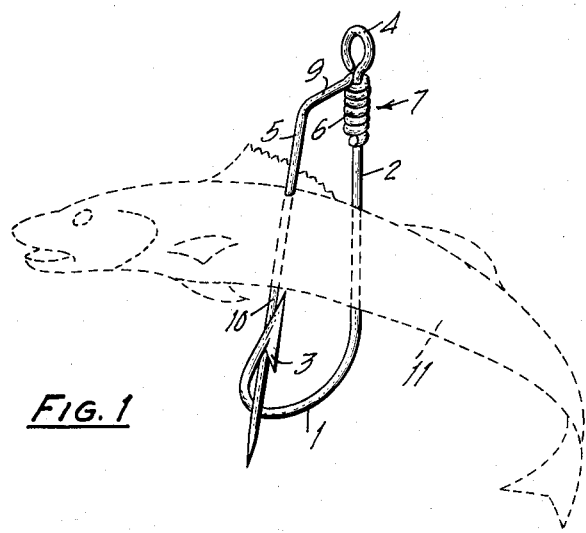
Fig. 1 is a perspective view of my hook showing a minnow attached thereto.
Figure 2:
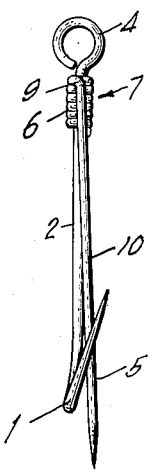
Fig. 2 is an elevation view of my hook as seen from the barbed side thereof.
Figure 3:
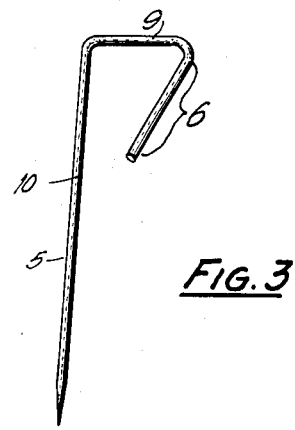
Fig. 3 is a detail elevation view of the attachment before it is fixed to the hook.

Speaking generally, my hook may be considered to function somewhat like a safety pin in which the bait attaching device 5, of stiff resilient wire, is similar to that portion of a safety pin which has a pointed end. Initially, the bait attaching device may take the form of that shown in Fig. 3 in which the portion 6 has been annealed so that it may be wrapped around the shank of the hook closely adjacent the eye 5, as shown at 7. Where the attachment is disposed entirely below the eye of the hook, as shown in Figs. 1 and 2, the portion 6 may be welded or soldered to the shank in order to prevent it from slipping downwardly thereon. Preferably, however, a portion 8 of the attachment passes through the eye of the hook so that the attachment is positively held in the position shown in Fig. 4. In any case, the portion 9 of the attachment extends outwardly from the shank of the hook at an abrupt angle, preferably at about right angles to the shank, and the portion 10 on which the bait 11 is impaled extends downwardly from the portion 9 in substantially spaced relation to the shank 2 and substantially coplanar therewith, and when portion 10 is unstressed, it extends over the point of the hook as at 10'.

Figure 4:
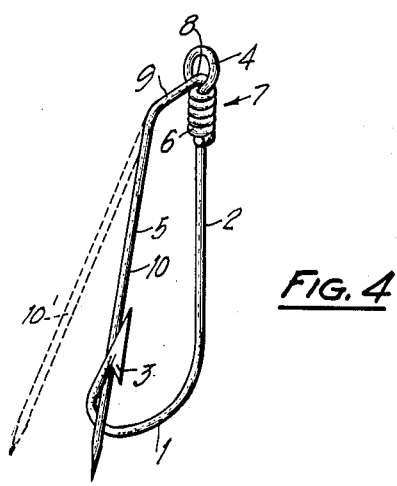
Fig. 4 is a perspective view of a slightly modified type of my hook and showing in dotted outline the position of the bait attaching means when it is unlatched from the barb.

In order to attach a bait to the hook, the impaling portion 10, having a sharp point, is unlatched from the barb and assumes the position shown in dotted outline in Fig. 4. The bait is then impaled thereon and the impaling portion is then returned to the position shown in Fig. 1 in latched condition with the barb 3. Thus, substantial clearance for the bait is provided between the impaling portion and the shank of the hook. In latched condition, the portion 10 extends beyond the hook 3, as seen in Figs. 1 and 4.

What I claim is:

1. A fish hook adapted for use with live bait and comprising a shank, an eye, a sharp pointed hook portion having a barb adjacent the point thereof, and a bait holding element; said element comprising a pin of stiff but resilient wire secured at one end to said shank closely adjacent said eye and having a sharp pointed free end; said pin having a first portion extending outwardly from said shank and substantially at right angles thereto at a point adjacent said eye, and a second, straight portion of a length extending beyond said hook portion and depending from said first portion and in substantially coplanar but laterally spaced relation to said shank; said second portion, when unstressed, extending over the point of said hook portion and in laterally spaced relation thereto to facilitate affixing a minnow to said element but adapted to be sprung towards said hook portion until a portion thereof spaced from said free end will interlock with said barb when said pin is released.

2. The structure set forth in claim 1 in which the one end of said bait holding element is wound around said shank and said first portion of said element extends through said eye.

References Cited in the file of this patent

UNITED STATES PATENTS

| | | |
|---|---|---|
| 94,894 | Kemlo | Sept. 14, 1869 |
| 939,316 | Ranum | Nov. 9, 1909 |
| 1,544,034 | Ratcliff | June 30, 1925 |
| 2,054,976 | Gould | Sept. 22, 1936 |
| 2,078,162 | Robins | Apr. 20, 1937 |
| 2,531,995 | Sweetman | Nov. 28, 1950 |
| 2,534,469 | Moore | Dec. 19, 1950 |